United States Patent
Chen et al.

(10) Patent No.: US 7,620,214 B2
(45) Date of Patent: Nov. 17, 2009

(54) HUMAN EYE DETECTION METHOD, APPARATUS, SYSTEM AND STORAGE MEDIUM

(75) Inventors: Xinwu Chen, Beijing (CN); Xin Ji, Beijing (CN); Libing Wang, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 751 days.

(21) Appl. No.: 10/736,686

(22) Filed: Dec. 17, 2003

(65) Prior Publication Data

US 2004/0136592 A1 Jul. 15, 2004

(30) Foreign Application Priority Data

Dec. 31, 2002 (CN) .............................. 02 1 60406

(51) Int. Cl.
G06K 9/00 (2006.01)
G06K 9/46 (2006.01)
G06K 9/66 (2006.01)
G06K 9/52 (2006.01)

(52) U.S. Cl. .................. 382/117; 382/115; 382/118; 382/194; 382/206

(58) Field of Classification Search .................. 348/78; 382/103, 104, 117, 194, 115, 118, 206; 351/201, 351/208, 204, 203

See application file for complete search history.

(56) References Cited

U.S. PATENT DOCUMENTS 5,008,946 A * 4/1991 Ando .......................... 382/104

(Continued)

FOREIGN PATENT DOCUMENTS

CN 1343479 A 4/2002

(Continued)

OTHER PUBLICATIONS

Halyuan Wu, "Face Detection and Rotations Estimation Using Color Information", the 5th IEEE International Workshop on Robot and Human Communication, 1996, pp. 341-346.

(Continued)

Primary Examiner—Matthew C Bella
Assistant Examiner—Michael A Newman
(74) Attorney, Agent, or Firm—Fitzpatrick, Cella, Harper & Scinto (57) ABSTRACT

The invention relates to a human eye detection method, apparatus, system and storage medium. According to the invention, candidate eye areas are detected from a given image by: reading in the image; analyzing the image and getting a list of candidate eye areas; selecting one unverified candidate eye area from said list; determining a neighborhood region of the selected candidate eye area; calculating the neighborhood region's size, which is recorded as S; processing the region, obtaining dark areas; counting the number of dark areas, which number is recorded as N; comparing the ratio N/S to a predetermined first threshold, if the ratio N/S is smaller than said first threshold, the candidate eye area is determined as a false eye area and deleted from the list; else, the candidate eye area is determined as a real eye area and remains in the list; repeating foresaid selecting step to comparing step until there is no unverified candidate eye area in the list; and outputting the list for purpose of subsequent processing of the image. The invention may be applied to human body detection.

7 Claims, 7 Drawing Sheets

U.S. PATENT DOCUMENTS

| | | | | |
|---|---|---|---|---|
| 5,012,522 | A * | 4/1991 | Lambert | 382/118 |
| 5,481,622 | A * | 1/1996 | Gerhardt et al. | 382/103 |
| 5,629,752 | A * | 5/1997 | Kinjo | 355/35 |
| 5,859,921 | A * | 1/1999 | Suzuki | 382/118 |
| 6,016,354 | A * | 1/2000 | Lin et al. | 382/117 |
| 6,072,892 | A * | 6/2000 | Kim | 382/117 |
| 6,257,722 | B1 * | 7/2001 | Toh | 351/208 |
| 6,633,655 | B1 * | 10/2003 | Hong et al. | 382/118 |
| 6,965,684 | B2 * | 11/2005 | Chen et al. | 382/103 |
| 6,980,692 | B2 * | 12/2005 | Chamberlain | 382/170 |
| 7,130,453 | B2 * | 10/2006 | Kondo et al. | 382/117 |
| 7,391,887 | B2 * | 6/2008 | Durnell | 382/117 |
| 2002/0081032 | A1 | 6/2002 | Chen et al. | |

FOREIGN PATENT DOCUMENTS

| | | |
|---|---|---|
| CN | 1404312 A | 9/2003 |

OTHER PUBLICATIONS

Kin-Man Lam, "A Fast Approach for Detecting Human Faces in a Complex Background", Proceedings of the 1998 IEEE International Symposium on Circuits and System, 1998, ISCAS '98 vol. 4, pp. 85-88.

* cited by examiner

HUMAN EYE DETECTION METHOD, APPARATUS, SYSTEM AND STORAGE MEDIUM

FIELD OF THE INVENTION

The present invention relates to an image processing method, especially a human eye detection method for detecting eyes in an image. The invention also relates to a human eye detection apparatus, a human eye detection system, and a storage medium storing human eye detection program codes therein.

BACKGROUND OF THE INVENTION

Nowadays, object identification technique can find many uses in many technical fields, such as the analysis of satellite photographs, automation, moving pictures compression and surveillance system. So far there have been a great number of techniques for recognizing an object in an image. One may enumerate, for example, template matching method, statistical pattern recognition method, structural pattern recognition method and neuron network, etc.

One of the objects to be identified is the human body itself, especially the human face. In Haiyuan Wu's "Face Detection and Rotations Estimation Using Color Information", the $5.^{th}$ IEEE International Workshop on Robot and Human Communication, 1996, pp 341-346, which is incorporated herein by reference, is disclosed a template matching method for detecting the human face. The effect of the method depends too much on the quality of the image to be detected, especially on the lighting conditions and the complexity of the background. The face differences between different races also affect the detection.

In some other methods, a human face may be detected from an image through detecting first its features (such as the eyes, the mouth and the nose, etc.). In Kin-Man Lam's "A Fast Approach for Detecting Human Faces in a Complex Background", Proceedings of the 1999 IEEE International Symposium on Circuits and System, 1998, ISCAS'98 Vol. 4, pp 85-88, which is incorporated herein by reference, is disclosed a method for detecting eyes, wherein a plurality of areas are assumed as possible eyes firstly, then they are checked according to some conditions to verify the real eye areas. The efficiency of this method is low because in an image there are too many possible eye areas (eye candidates).

To improve said prior art, the assignee has developed an image processing method and apparatus, system and storage system, which were disclosed in pending CN patent application No.00127067.2 (Publication No. CN1343479A) filed on Sep. 15, 2000, and incorporated herein by reference. Using the method, one can get a list of candidate eye areas in an image. Then by matching the candidate eyes into pairs, one can get a list of candidate human face areas.

Among said candidate eye areas, however, there are some false eye areas. As a result, among said candidate human face areas, there are also some false face areas. Said false eye areas or false face areas should be excluded.

To this end, in another pending CN patent application No.01132807.x, titled "Image Processing Method and Apparatus, System and Storage System", filed on Sep. 6, 2001, the assignee provided a method for eliminating the non-face areas among the candidate face areas, by means of analyzing an annular portion of each candidate face area.

SUMMARY OF THE INVENTION

Also to said end, the present application seeks to provide a human eye detection method for detecting eye areas in a given image, especially for determining whether a candidate eye area in a given image is a real eye area, thus excluding false eye areas and obtaining candidate eye areas more accurately.

Other objects of the present invention are to provide a human eye detection apparatus, system and storage medium for detecting eye areas in a given image, especially for determining whether a candidate eye area in a given image is a real eye area.

According to one aspect of the invention, above-said object has been achieved through a human eye detection method comprising the following steps:

a) Reading in an image;
b) Analyzing the image and getting a list of candidate eye areas;
c) selecting one unverified candidate eye area from said list;
d) determining a neighborhood region of the selected candidate eye area;
e) calculating the neighborhood region's size, which is recorded as S;
f) processing the region, obtaining dark areas;
g) counting the number of dark areas, which number is recorded as N;
h) comparing the ratio N/S to a predetermined first threshold; if the ratio N/S is smaller than said first threshold, the candidate eye area is determined as a real eye area and remains in the list; else, the candidate eye area is determined as a false eye area and deleted from the list;
i) repeating steps c) to h) until there is no unverified candidate eye area in the list; and
j) Outputting the list for purpose of subsequent processing of the image.

In a variant of the invention, the processing of each candidate eye area can be in parallel, instead of being sequential as described above. In another variant of the invention, the processing of each candidate eye area can be in a batch mode, that is, in a hybrid mode integrating the parallel processing and the serial processing.

According to another aspect of the invention, the foregoing objects have been achieved through provision of a human eye detection apparatus comprising: reading means for reading in an image; candidate detection means for analyzing the image and getting a list of candidate eye areas; and output means for outputting the list for purpose of subsequent processing of the image; characterized in that, the apparatus further comprises selecting means for selecting one candidate eye area to be verified from the list, verifying means for determining whether said one candidate eye area is a true eye area, and outputting the result; and controlling means for controlling the selecting means so that all the candidate eye areas in the list are verified; and in that the verifying means further comprising:

neighborhood region determining means for determining a neighborhood region for the candidate eye area;
calculating means for calculating the region's size, which is recorded as S;
dark area determining means for processing the region and obtaining dark areas;
counting means for counting the number of dark areas, which number is recorded as N; and comparing means for comparing the ratio N/S to a predetermined first threshold; if the ratio N/S is smaller than said first threshold, the candidate eye area is determined as a real eye area and remains in the list; else, the candidate eye area is determined as a false eye area and deleted from the list.

According to a further aspect of the invention, the foregoing objects have been achieved through provision of a human eye detection system comprising: an image source, a human eye detection apparatus as described above and a subsequent processing apparatus.

According to a still further aspect of the invention, the foregoing objects have been achieved through provision of a storage medium storing human eye detection program codes comprising:

reading codes for reading in an image;

candidate detection codes for analyzing the reading image and getting a list of candidate eye areas;

selecting codes for selecting one candidate eye area to be verified from the list;

neighborhood region determining codes for determining a neighborhood region for the candidate eye area;

calculating codes for calculating the region's size, which is recorded as S;

dark area determining codes for processing the region and obtaining dark areas;

counting codes for counting the number of dark areas, which number is recorded as N;

comparing codes for comparing the ratio N/S to a predetermined first threshold; if the ratio N/S is smaller than said first threshold, the candidate eye area is determined as a real eye area and remains in the list; else, the candidate eye area is determined as a false eye area and deleted from the list;

controlling codes for controlling the selecting codes so that all the candidate eye areas in the list are verified; and output codes for outputting the list for purpose of subsequent processing of the image.

By the aid of the invention, one can verify the candidate eye areas and exclude the false eye areas quickly and accurately. Consequently, human eyes or faces may be detected precisely and quickly from within an image.

BRIEF DESCRIPTION OF THE DRAWINGS

Other objects, features and advantages of the invention will become more apparent after reading the following detailed description of the preferred embodiments. The accompanying drawings, which are incorporated in and constitute a part of the specification, illustrate embodiments of the invention and, together with the description, serve to explain the principles of the invention. In the drawings.

DESCRIPTION OF THE PREFERRED EMBODIMENTS

Example of Computer System

The method of the invention may be implemented in any information processing equipment, for example, a personal computer (PC), a notebook, or a single-chip microcomputer (SCM) embedded in a camera, a video camera, a scanner, an entrance guard system, and etc. To a person skilled in the art, it would be easy to realize the method of the invention through software, hardware and/or firmware. It should be particularly noted that, to implement any step of the method or any combination of the steps, it is obvious to a person skilled in the art that it may be necessary to use I/O device, memory device, microprocessor such as CPU, and the like. The following descriptions of the method of the invention will not necessarily mention such devices, although they are actually used.

Figure 7:
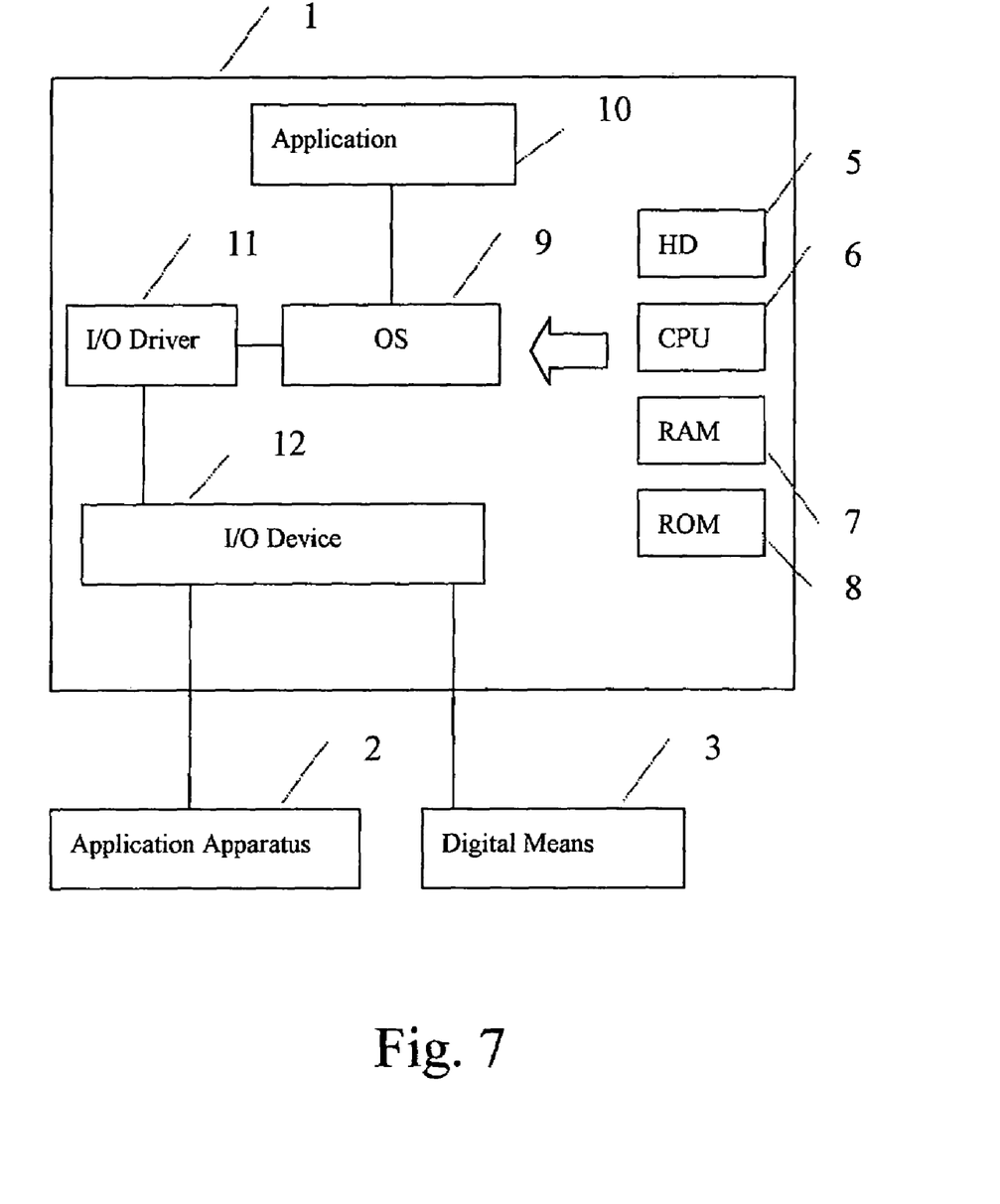
FIG. 7 is a block diagram showing an example of a computer system in which the method and apparatus of the invention may be implemented.

As the information processing equipment mentioned above, the block diagram illustrated in FIG. 7 shows an example of a computer system in which the method and apparatus of the invention may be implemented. Note that the computer system shown in FIG. 7 is just explanatory and does not intend to limit the scope of the invention.

From the viewpoint of hardware, a computer 1 comprises a CPU 6, a hard disk (HD) 5, a RAM 7, a ROM 8 and I/O devices 12. The I/O devices may include input means such as keyboard, touch pad, trackball and mouse and etc. output means such as printer and monitor, and input/output means such as floppy disk drive, optical disk drive and communication ports.

From the viewpoint of software, the computer comprises substantially operation system (OS) 9, I/O drivers 11 and various applications 10. As operating system, any commercially available OS may be used, such as Windows series (Windows is a trademark owned by Microsoft Corporation) or Linux-based OS. The I/O drivers are for driving respectively said I/O devices. The applications may be any kind of applications such as word processing application, image processing application and the like, and includes any existing applications that could be used in the present invention and applications programmed for the present invention, which call said existing applications.

Thus, in the present invention, the method may be implemented by the OS, the applications and I/O drivers in the hardware of the computer.

Further, the computer 1 may be connected to a digital means 3 and an application apparatus 2. The digital means serves as an image source 502 as described below, which could be a camera, a video camera, a scanner or digitizer for converting analog image to digital image. The results obtained by the method of the invention are output to the application apparatus 2, which, on the basis of said results, executes proper operations. The application apparatus may also be a camera (and the like) that serves as said digital means at the same time, or may be any automatic control system, such as entrance guard system. The application apparatus may also be embodied as another application (in combination with hardware) implemented within the computer 1 and for further processing the image.

Human Eye Detection Method

Figure 1:
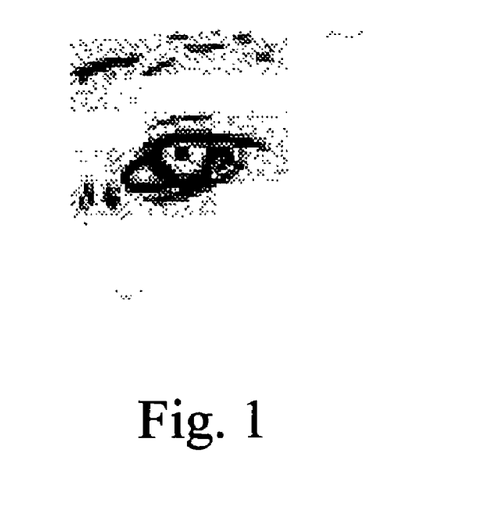
FIG. 1 shows an eye area and its neighborhood region in a processed image.
Figure 2:
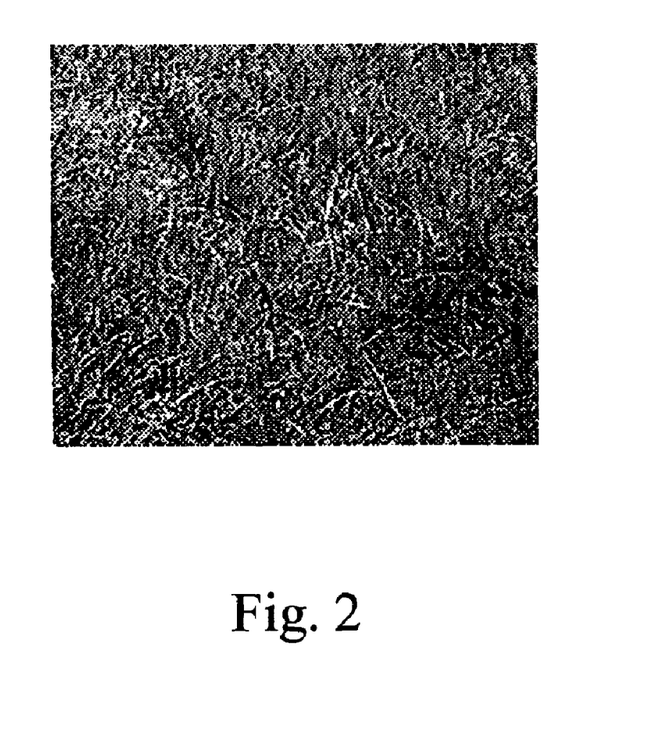
FIG. 2 shows a processed image containing no human eye.

The invention is on the basis of a fact that in an image, the neighborhood region of the human eye has its unique features. After being processed properly, for example by the method disclosed in said CN patent application No.00127067.2, such features are presented as dark areas distributed in certain manner and with certain density, as show in FIG. 1. While in an image containing no human eyes and processed by same method, there are many dark areas distributed unorderly, as shown in FIG. 2. In the invention, a candidate eye area is determined as true or false according to the density of dark areas distributed in a neighborhood region. The following is a detailed description of the invention.

First Embodiment

Figure 3:
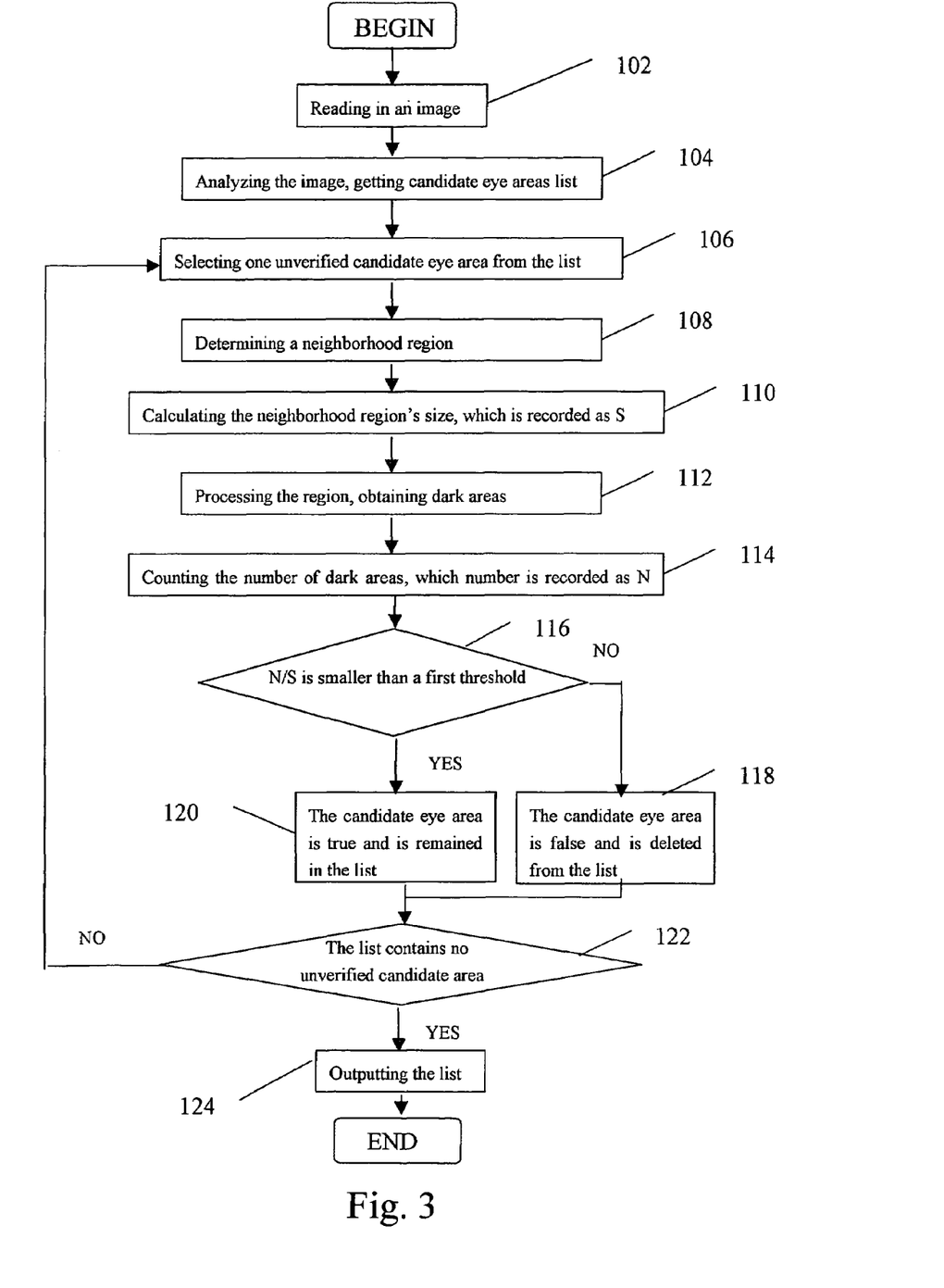
FIG. 3 is a flow chart of a first embodiment of a human eye detection method according to the invention.

Referring to FIG. 3 showing a flow chart of a first embodiment of a human eye detection method of the invention. The method begins with a reading step 102 in which an image in digital or analog format to be processed is read in from an image source, which may be of any type, such as memory device incorporated in PC, camera and etc.

Then in analyzing step 104, the image is analyzed by the aid of the method disclosed in said CN patent application No.00127067.2, generating a list of candidate eye areas. If the image read in said reading step 102 is an analog image, the image should be digitalized before being analyzed. The analyzing step 104 also may be implemented by using other known methods, such as region growing method, region splitting method and hybrid method.

In selecting step 106, an unverified candidate eye area is selected from the list randomly or sequentially. Then the method proceeds to neighborhood region determining step 108, in which a neighborhood region is defined for said unverified candidate eye area. The neighborhood region can be defined as a rectangle the center of which is the eye's center. Alternatively, the neighborhood region can be defined as any arbitrary polygons encompassing the candidate eye area. The rectangle's size is in the range from 1 pixel to the size of the entire image. Preferably, the rectangle's size is in the range from the image size multiplied by 0.0001 to that multiplied by 0.01. The most preferably, the rectangle's size is the image size multiplied by 0.0011.

Then calculating the size, recorded as S, of the neighborhood region in calculating step 110. The size of the neighborhood region is defined as the number of pixels contained in the neighborhood region. When the neighborhood region is chosen as a rectangle, the size will equal the production of its length multiplied by its width. For example, if both the length and the width are selected as 30 pixels, then the number of pixels contained in the neighborhood region will be 30×30=900, that's the size S of the neighborhood region.

After said calculating step 110, the method continues to a dark area determining step 112, in which the neighborhood region is processed to obtain dark areas. Here, a "dark area" means an area of connected pixels each having, after being processed, a gray level higher than a predetermined second threshold. In an extreme case, a dark area may be a single dark pixel without connected dark pixels.

The dark areas can be determined in the same way as that used in determining the candidate eye area list. They can also be determined in different ways. Just as described above, the method disclosed in said CN patent application No.00127067.2 and other known methods, such as region growing method, region splitting method and hybrid method, can be used.

For example, to obtain the dark areas, a binarization method can be applied to the neighborhood region, in which case the binarization threshold is just above-said second threshold. Then the region transforms to a white and black image, wherein the black areas are treated as said dark areas.

Then in counting step 114, the number of dark areas is counted and recorded as N. The next step is a comparing step 116 in which the ratio N/S is compared to a predetermined first threshold. If N/S isn't smaller than the first threshold, then the method proceeds to a deleting step 118 in which the candidate eye area is determined as false and is deleted from the list, else the method proceeds to a remaining step 120 in which the candidate eye area is determined as true and remains in the list.

The predetermined first threshold is a function of: the method used in said analyzing step 104, the shape and the size of said neighborhood region, the method used in said dark area determining step 112 for obtaining said dark areas, and said second threshold. As the case may be, the threshold may be a previously stored value, or may be calculated from said variables. In the latter case, the method of the invention shall include a threshold-calculating step before the comparing step 116.

As examples, the first threshold will generally fall in the range of 0.15-0.0015, and the most preferable value is 0.015.

A judging step 122 follows after said deleting step 118 or remaining step 120 to determine whether the list contains more unverified candidate eye area. If yes, then the method returns to said selecting step 106; otherwise the method proceeds to an outputting step 124 for outputting the list for purpose of subsequent processing.

In a variant of the invention, the processing of each candidate eye area can be in parallel, instead of being sequential as described above.

In another variant of the invention, the processing of each candidate eye area can be in a batch mode, that is, in a hybrid mode integrating the parallel processing and the serial processing. In this case, in selecting step 106, a batch of unverified candidate eye areas is selected to be processed in neighborhood region determining step 108 to judging step 122, then a next batch is selected, if any.

Second Embodiment

Figure 4:
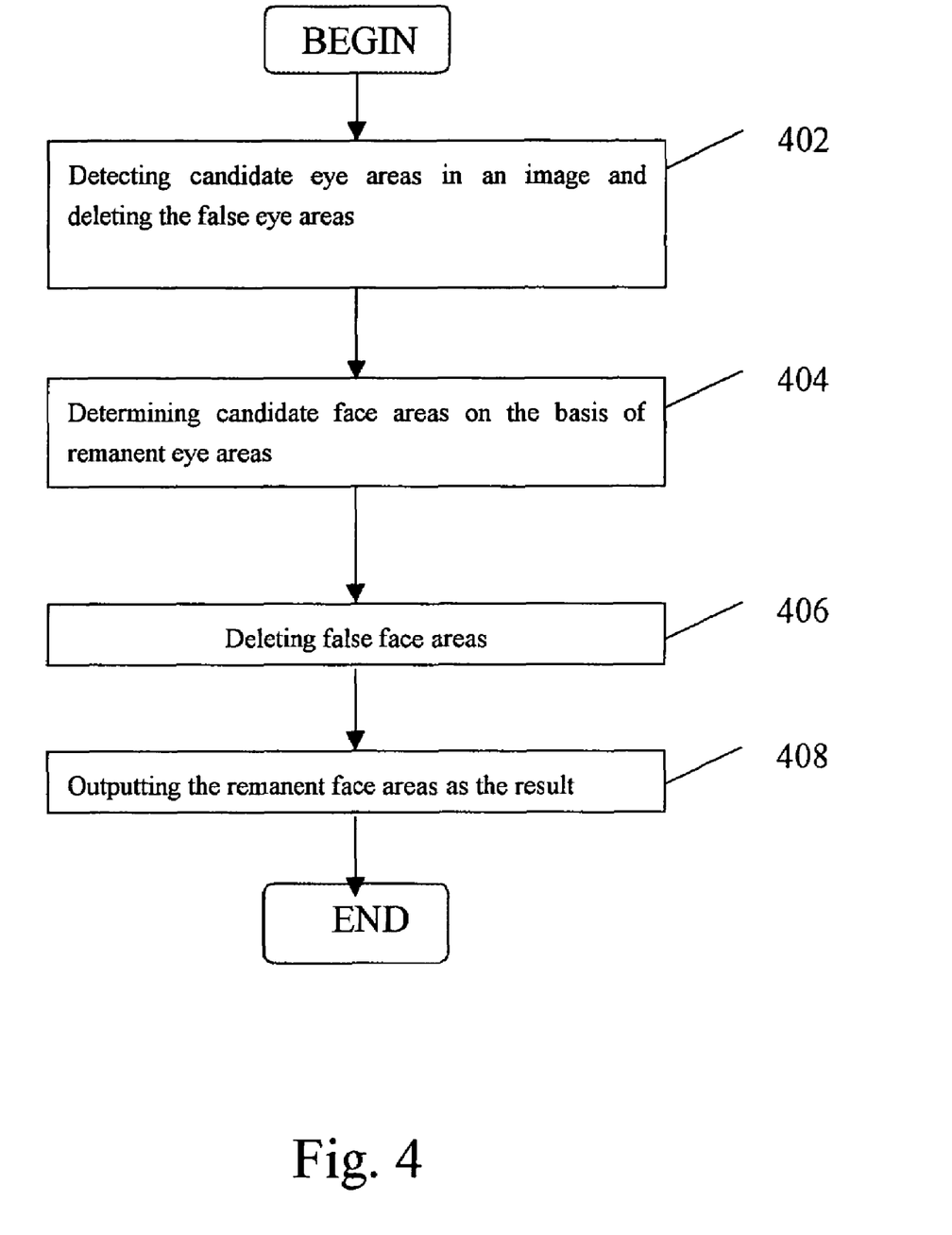
FIG. 4 is a flow chart of a second embodiment of a human eye detection method according to the invention.

In a second embodiment, the method of the invention further includes the steps as described in the following. As shown in FIG. 4, the detecting step 402 consists of all the steps as illustrated with reference to FIG. 3. Then in a face determining step 404, candidate face areas are determined on the basis of remanent candidate eye areas obtained in said detecting step 402. There are many ways for determining candidate face areas from candidate eye areas. For example, a candidate face area may be determined from one candidate eye area on the basis of the inherent relative position of an eye in the face. As another example, on the basis of the symmetry of a pair eyes, and/or the distance between a pair of eyes and/or the normal relative position of the eyes in an image, the candidate eye areas may be matched into pairs, then a candidate face area may be determined on the basis of the inherent relative positions of a pair of eyes in the face.

Figure 8:
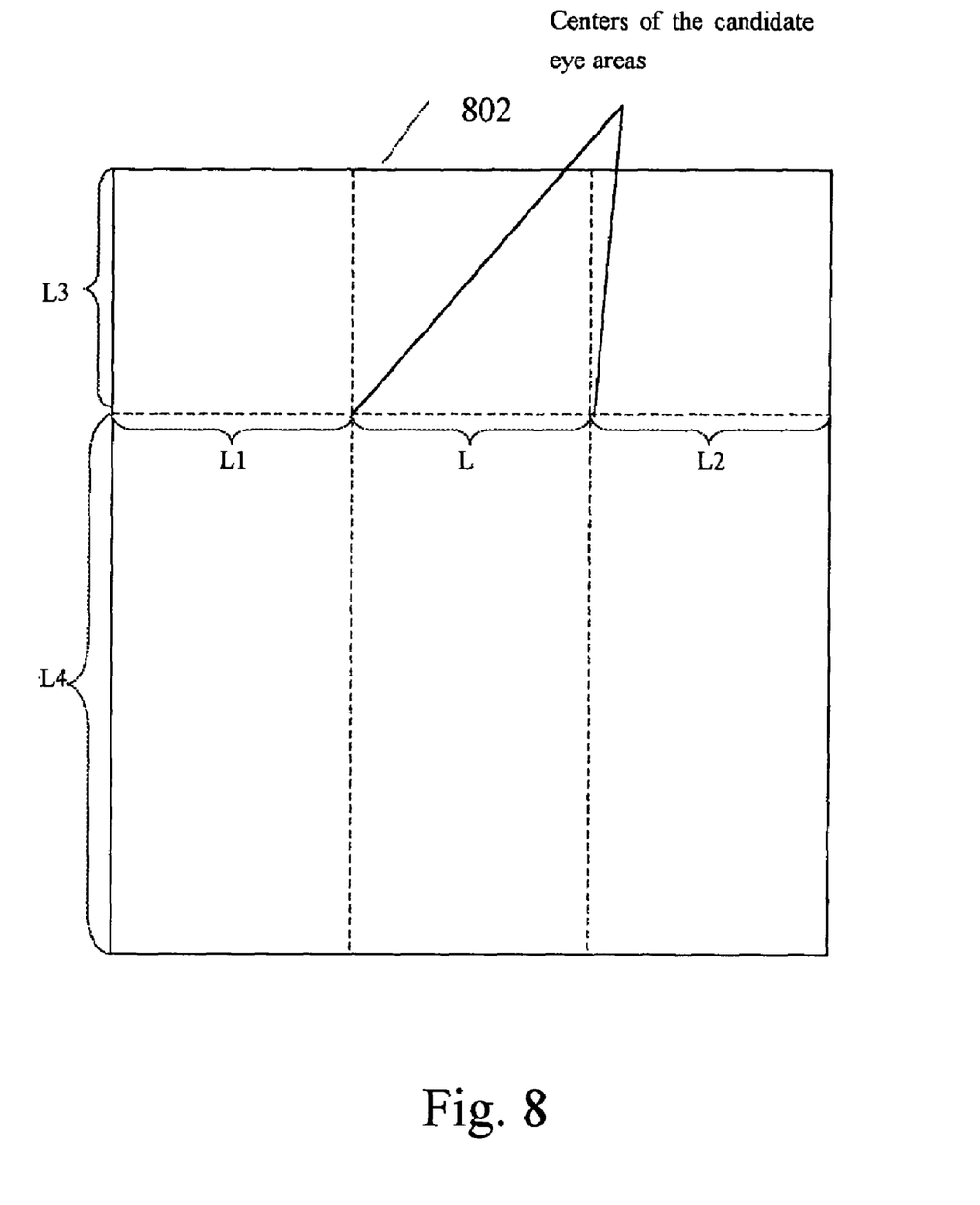
FIG. 8 is a schematic diagram showing a way for generating a human face candidate area from a pair of human eye areas detected.

An illustrative example of the way for determining human face candidates will now be described referring to FIG. 8. Upon detecting at least two candidate eye areas, any arbitrary pair of the candidate eye areas is selected as a pair of candidate eyes. For each pair of eye areas, the distance L between the centers of them is determined. Then, a rectangular region 802 is determined as shown in FIG. 8, wherein the lengths of the portions of the edges of the rectangular, L1, L2, L3 and L4 are determined based on the positions of the centers of the pair of candidate eye areas, the distance L and the corresponding inherent ratios in the face of human being, which ratios may be obtained statistically. For human face detection, besides the rectangular region shown in FIG. 8, another rectangular region may be determined for detection of human face, which region is symmetrical to the rectangular region of FIG. 8 with respect to the line passing the centers of the pair of candidate eye areas.

In the case that more than two candidate eye areas are detected, each possible pair of eye areas are chosen for determination of corresponding candidate human faces. And for each pair of candidate eye areas in the image, two rectangular regions may be determined in the manner as described above.

The shape of the region to be treated as candidate human face is not limited to rectangular. Rather, it may be of any appropriate shape, such as ellipse. Following is a face deleting step 406 for deleting false face areas, for example using the method proposed in pending CN patent application No.01132807.x. Certainly, other methods may be used for deleting false face areas, for example, on the basis of the relative position of the face to other parts of the human body, or on the basis of the relative position of the face in an image, structural pattern recognition method may be used. Last, in an outputting step 408, the remanent face areas are output as the result and for subsequent processing.

Human Eye Detection Apparatus and System

The invention further provides a human eye detection apparatus and system, which will be described in details in the following text. Similar to the method described above, any one of the components constituting the human eye detection apparatus and system of the invention may be a component or a combination of components of any information processing equipment as described above, or a combination of software and/or hardware and/or firmware installed on or incorporated in any information processing equipment as described above. For a person skilled in the art, it would be easy to realize the components of the invented apparatus. Also, it is obvious to a person skilled in the art that the functioning of each of the components may involve the use of I/O device, memory device, microprocessor such as CPU, and the like. The following descriptions of the apparatus and system of the invention will not necessarily mention such devices, although they are actually used. As a specific example of the information processing equipment, a computer system has been described above and its description is omitted here.

Figure 5:
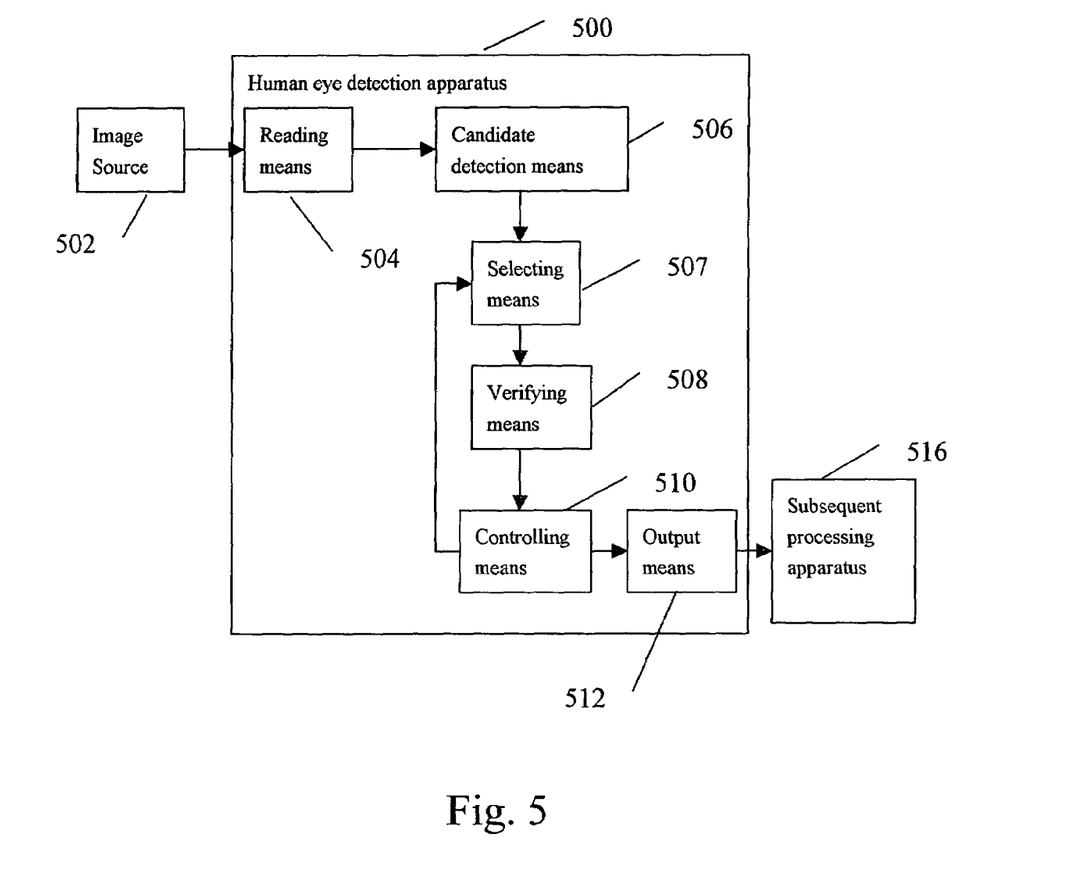
FIG. 5 is a schematic block diagram of a first embodiment of a human eye detection system of the invention.

As shown in FIG. 5, a human eye detection system according to the invention includes an image source 502 for supplying image to be processed to a human eye detection apparatus 500 of the invention, said human eye detection apparatus 500 and a subsequent processing apparatus 516. The image source 502 may be any storage medium such as a memory device of PC, or may be an image pick-up apparatus such as a camera or scanner, and etc. The subsequent processing apparatus may be an output device such as a monitor or a printer for outputting the images processed by the human eye detection apparatus, or may be a human face determining device for determining face areas in an image according to the output of the human eye detection apparatus, or may be an automation system such as an entrance guard system, and etc.

When the subsequent processing apparatus 516 is a human face determining device, it further include the following means: candidate face determining means for determining face candidates on the basis of remanent candidate eye areas output from said human eye detection apparatus; false face deleting means for deleting false face areas; and output means for outputting the remanent face areas for subsequent processing.

As described above, for the candidate face determining means, there are many ways for determining candidate face areas from candidate eye areas. And also, for the false face deleting means, there are many ways for excluding the false face candidates, as described above.

Now return to FIG. 5, the human eye detection apparatus 500 of the invention comprises reading means 504, candidate detection means 506; selecting means 507, verifying means 508, controlling means 510 and output means 512.

The reading means 504 receives input from an image source 502. The read-in image is processed by candidate detection means 506, which generates a list of candidate eye areas. The selecting means is in charge of selecting one unverified candidate eye area from said list to be verified by the verifying means 508. The controlling means 510 obtains the verification result of the verifying means 508, deletes the candidate eye area if it is false, and controls the selecting means 507 to select a next unverified candidate eye area, if any. When there is no unverified candidate eye area in the list, the controlling means 510 inform the output means 512 to output the final list to said subsequent processing apparatus 516.

Figure 6:
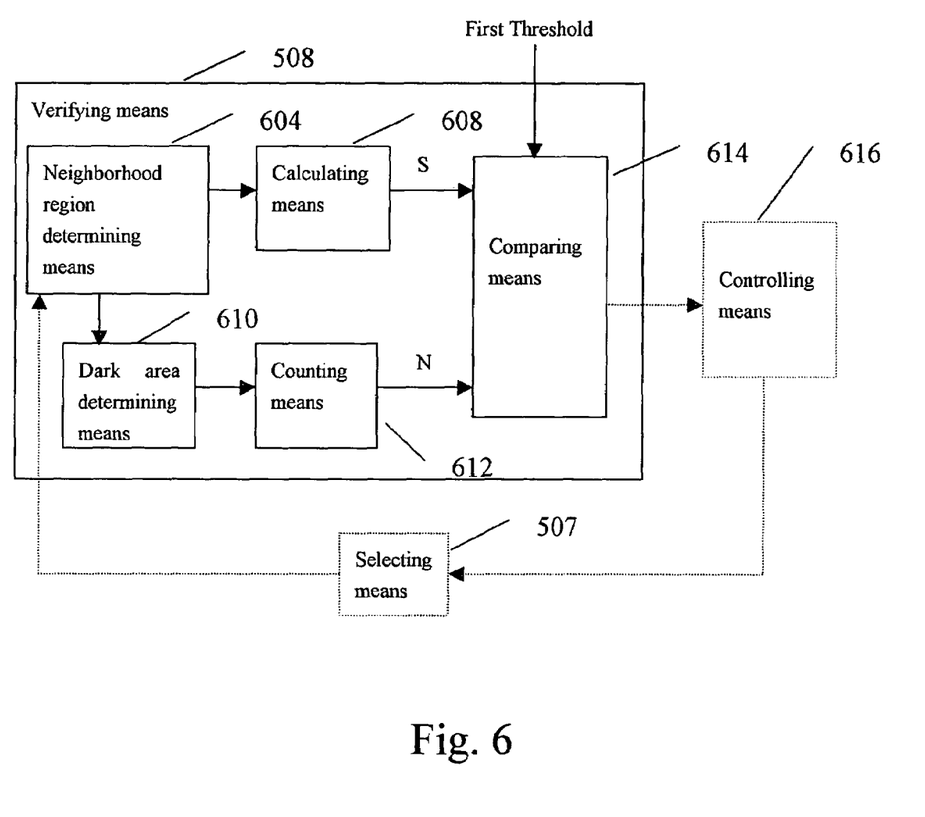
FIG. 6 is a schematic block diagram of the verifying means of the human eye detection system as shown in FIG. 5.

The construction of said verifying means 508 is shown in FIG. 6, wherein the dashed arrows and blocks are for illustrating the connecting relations of the components of the verifying means with other components of the human eye detection apparatus 500.

As shown in FIG. 6, the verifying means 508 includes neighborhood region determining means 604, calculating means 608, dark area determining means 610, counting means 612 and comparing means 614. The neighborhood region determining means receives from said selecting means 507 an unverified candidate eye area, for which it determines a neighborhood region. Then the dark area determining means 610 processes the region to obtain dark areas, and the calculating means 608 calculates the area of said region, which is recorded as S. The counting means 612 counts the number N of said dark areas. The comparing means 614 receives said area value S and said number N, and compares the value N/S with a predetermined first threshold, with the result being output to said controlling means 616, which in turn, as described above, controls said selecting means 507 or outputs the result to the subsequent processing apparatus 516.

The dark area determining means may be as same as said candidate detection means 506, or is said candidate detection means 506 itself Alternatively, the dark area determining means may be a binarization means.

In one embodiment of the human face detection apparatus, said first threshold may be stored previously somewhere, for example, in the comparing means 614, the verifying means 508, or the human eye detection apparatus.

However, as described above, the first threshold is a function of the method used in said analyzing step 102, the shape and the size of said neighborhood region, the method used in said dark area determining step 112 for obtaining said dark areas and said second threshold. Therefore, in a second embodiment, the human eye detection apparatus 500, specifically the verifying means 508, more specifically the comparing means, may comprise a threshold determining means for determining said first threshold on the basis of said variables.

Storage Medium

The objects of the invention may also be realized through running a program or a set of programs on any information processing equipment as described above, which may be communicated with said image source 502 and subsequent processing apparatus 516. Said information processing equipment, image source and subsequent processing apparatus are all well-known universal equipments. Therefore, the objects of the invention may be realized by merely providing program codes, which can implement said human eye detection method. That is to say, a storage medium storing program codes for implementing said human eye detection method constitutes the invention.

For a person skilled in the art, it would have been easy to program said human eye detection method using any program language. Therefore, a detailed description of the program codes is omitted.

And obviously, said storage medium may be of any type known by a person skilled in the art or developed in the future, so it is unnecessary to enumerate various storage media herein.

While the invention has been described with reference to specific steps and structures disclosed herein, it is not confined to the details set forth and this application is intended to cover all the changes, modifications and variations which are not far away from the spirit and the scope of the invention.

The invention claimed is:

1. A human eye detection method for detecting a human eye by determining whether an unverified candidate eye area is a true eye area based on a neighborhood region of the unverified candidate eye area, comprising the following steps:
   a) inputting an image into an information processing apparatus;
   b) analyzing the image and getting the unverified candidate eye area, in the information processing apparatus;
   c) determining, in the information processing apparatus, the neighborhood region based on the unverified candidate eye area, the neighborhood region being defined as rectangle, the center of which is the center of the unverified candidate eye area and the size of which is calculated from the size of the image;
   d) calculating, in the information processing apparatus, the neighborhood region's size, which is recorded as S;
   e) detecting, in the information processing apparatus, dark areas in the neighborhood region and counting the number of dark areas, which number is recorded as N; and
   f) determining, in the information processing apparatus, whether or not the unverified candidate eye area is a true eye area by comparing the ratio N/S to a predetermined threshold, wherein if the ratio N/S is smaller than said threshold, the unverified candidate eye area is determined to be a true eye area; else, the unverified candidate eye area is determined to be a false eye area.

2. The human eye detection method according to claim 1, characterized in that the method further comprises the step of:
   determining candidate face areas on the basis of a candidate eye area determined to be a true eye area in step f).

3. The human eye detection method according to claim 1 or 2, characterized in that, step e), executes a binarization processing for detecting the dark areas.

4. The human eye detection method according to claim 1 or 2, further comprising a threshold calculating step before the step f), for calculating said threshold.

5. A human eye detection apparatus for detecting a human eye by determining whether an unverified candidate eye area is a true eye area based on a neighborhood region of the unverified candidate eye area, comprising:
   an input unit that inputs an image; and
   a processor that (i) analyzes the image to obtain the unverified candidate eye area; (ii) determines the neighborhood region based on the unverified candidate eye area, the neighborhood region being defined as a rectangle, the center of which is the center of the unverified candidate eye area and the size of which is calculated from the size of the image, (iii) calculates the neighborhood region's size S, (iv) detects dark areas in the neighborhood region and determines the total count N of dark areas in the neighborhood region, (v) and determines whether or not the unverified candidate eye area is a true eye area by comparing the ratio N/S to a predetermined threshold, wherein if the ratio N/S is smaller than the threshold, the unverified candidate eye area is determined to be a true eye area, else the unverified candidate eye area is determined to be a false eye area.

6. A human eye detection apparatus according to claim 5, wherein said processor executes a binarization processing to detect the dark areas.

7. A computer-readable storage medium embodying program codes for causing an apparatus to perform a human eye detection method for detecting a human eye by determining whether an unverified candidate eye area is a true eye area based on a neighborhood region of the unverified candidate eye area, comprising:
   inputting an image;
   analyzing the image and getting the unverified candidate eye area;
   determining the neighborhood region based on the unverified candidate eye area, the neighborhood region being defined as a rectangle, the center of which is the center of the unverified candidate eye area and the size of which is calculated from the size of the image;
   calculating the neighborhood region's size, which is recorded as S;
   detecting dark areas in the neighborhood region and counting the number of dark areas, which number is recorded as N; and
   determining whether or not the unverified candidate eye area is a true eye area by comparing the ratio N/S to a predetermined first threshold, wherein if the ratio N/S is smaller than the threshold, the unverified candidate eye area is determined to be a true eye area, else the unverified candidate eye area is determined to be a false eye area.

* * * * *